(12) United States Patent
Su

(10) Patent No.: US 9,760,624 B1
(45) Date of Patent: Sep. 12, 2017

(54) AUTOMATIC SELECTION OF AN INPUT LANGUAGE

(71) Applicant: Google Inc., Mountain View, CA (US)

(72) Inventor: Bor-Yiing Su, Albany, CA (US)

(73) Assignee: Google Inc., Mountain View, CA (US)

( * ) Notice: Subject to any disclaimer, the term of this patent is extended or adjusted under 35 U.S.C. 154(b) by 256 days.

(21) Appl. No.: 14/058,134

(22) Filed: Oct. 18, 2013

(51) Int. Cl.
*G06F 17/30* (2006.01)

(52) U.S. Cl.
CPC ................ *G06F 17/3061* (2013.01)

(58) Field of Classification Search
USPC ........ 707/607, 609, 687, 705, 790, 813, 953
See application file for complete search history.

(56) References Cited

U.S. PATENT DOCUMENTS

| | | |
|---|---|---|
| 7,472,113 B1 | 12/2008 | Watson et al. |
| 7,506,254 B2 | 3/2009 | Franz |
| 8,126,827 B2 | 2/2012 | Badger et al. |
| 8,359,371 B2 | 1/2013 | Miura |
| 8,407,236 B2 | 3/2013 | Chen et al. |
| 2007/0294084 A1* | 12/2007 | Cross ........................... 704/251 |
| 2009/0112845 A1 | 4/2009 | Byers et al. |
| 2010/0287049 A1 | 11/2010 | Rousso et al. |
| 2011/0238501 A1* | 9/2011 | Almeida ................ G06Q 30/02 705/14.56 |
| 2012/0016658 A1 | 1/2012 | Wu et al. |
| 2012/0066359 A1* | 3/2012 | Freeman ............ G06Q 30/0256 709/223 |
| 2012/0173222 A1 | 7/2012 | Wang et al. |
| 2012/0296627 A1 | 11/2012 | Suzuki et al. |
| 2012/0297332 A1 | 11/2012 | Changuion et al. |
| 2013/0124187 A1* | 5/2013 | Qin ........................... G06F 3/01 704/8 |
| 2013/0159920 A1 | 6/2013 | Scott et al. |

* cited by examiner

*Primary Examiner* — Sana Al Hashemi
(74) *Attorney, Agent, or Firm* — McDermott Will & Emery LLP

(57) ABSTRACT

Various aspects of the subject technology relate to systems, methods, and machine-readable media for automatically selecting an input language (e.g., English, Chinese, Japanese, Italian, Russian, French, etc.) for a resource. The resource may be an online resource such as a web page, a web service, or an application. The input language may be selected based on a resource identifier for an online resource, based on content analysis of the online resource, or based on a combination of these methods.

20 Claims, 6 Drawing Sheets

100

Domain History

User ID: JoeSmith
Domain: thisdomain.com

Active Page 1

Web Page: www.email.thisdomain.com
Feature Vector: <10, 100, 50, 0>
Last Accessed Date/Time: 10/03/13 @ 22:14

— 520

Active Page 2

Web Page: profile.thisdomain.com
Feature Vector: <20, 30, 0, 0>
Last Accessed Date/Time: 10/02/13 @ 14:28

— 525

Active Page 3

Web Page: contacts.thisdomain.com
Feature Vector: <50, 200, 0, 10>
Last Accessed Date/Time: 09/29/13 @ 10:53

AUTOMATIC SELECTION OF AN INPUT LANGUAGE

BACKGROUND

The present disclosure generally relates to updating computer software products and, in particular, providing software updates from an update server.

Multilingual individuals may interact with online resources using multiple languages. They may visit and use web pages that use one language and visit other web pages that use another language. Furthermore, some online resources (e.g., an email service) may allow the user to interact with the resource using a language of the user's choice where some users may use one language while other users may use another language. Accordingly, multilingual users may frequently switch between input languages.

SUMMARY

Various aspects of the subject technology relate to a system for selecting an input language. The system includes one or more processors and a machine-readable medium comprising instructions stored therein, which when executed by the one or more processors, cause the one or more processors to perform operations. The operations include accessing a domain history corresponding to a domain of an online resource loaded in a web browser, wherein the domain history contains a feature vector for each of a number of active pages visited by a user and belonging to the domain, the feature vector comprising character information for a number of languages, calculating a language score for each language in the number of languages based on the feature vectors in the domain history, and selecting an input language based on the language scores.

Some aspects of the subject technology relate to a method for selecting an input language for a web page. The method includes accessing a domain history corresponding to a domain of the web page loaded in a web browser, wherein the domain history contains a feature vector for each of a number of active pages visited by a user and belonging to the domain, the feature vector comprising character information for a number of languages, calculating a language score for each language in the number of languages based on the feature vectors in the domain history, and selecting, using a processor, an input language based on the language scores.

Other aspects relate to a machine-readable medium including instructions stored therein, which when executed by a machine, cause the machine to perform operations for selecting an input language. The operations include accessing a domain history corresponding to a domain of the resource loaded in the user interface, wherein the domain history contains a feature vector for each of a number of active pages visited by a user and belonging to the domain, the feature vector comprising character information for a number of languages, calculating a language score for each language in the number of languages based on the feature vectors in the domain history, and selecting an input language based on the language scores.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

FIG. 5 is a block diagram illustrating a conceptual representation of a domain history, in accordance with various aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Various applications allow users to select an input language with which to use. For example, operating systems, web browsers, text editors, voice-recognition software may all enable a user to input text in a particular selected language. In some cases, multilingual individuals may prefer to use different languages in different environments and settings. For example, a user may prefer to use one language when interacting with one resource (e.g., an online resource such as a website) and another language when interacting with another resource. There may be various reasons for the user's preference. In some cases, the user may be using the resources for different reasons (e.g., a resource is mainly used for work while another resource is primarily used for communicating with family) or the user may be communicating to different audiences (e.g., coworkers, family, friends, contacts in another country, etc.). Accordingly, multilingual users may frequently switch between input languages. However, switching between input languages may be inconvenient and, in some cases, users may forget to switch input languages before they begin typing.

Various aspects of the subject technology relate to systems and methods for automatically selecting an input language (e.g., English, Chinese, Japanese, Italian, Russian, Korean, etc.) for a resource, such as an online resource. The online resource may be, for example, a web page, a web service, an application, or any other content accessible via a network. The input language may be selected based on a resource identifier for an online resource, based on content analysis of the online resource, or based on a combination of these methods.

Figure 1:
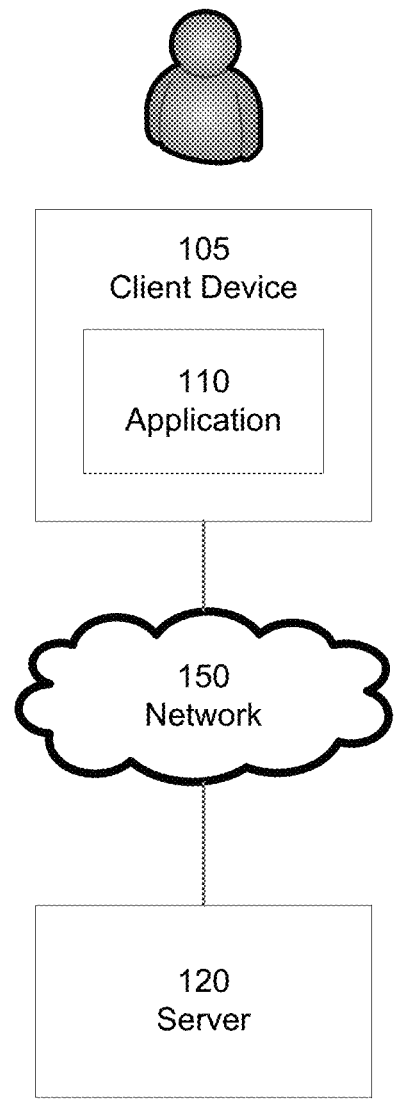
FIG. 1 is a conceptual block diagram illustrating an example environment in which a system for automatically selecting an input language for a resource may operate, in accordance with various aspects of the subject technology.

FIG. 1 is a conceptual block diagram illustrating an example environment 100 in which a system for automatically selecting an input language for a resource may operate, in accordance with various aspects of the subject technology. The environment 100 includes at least one client device 105 and at least one server 120 in communication via a network 150 such as the Internet.

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The client device 105 can be any machine able to communicate with the server 120 via the network 150. The client device 105 may be, for example, a desktop computer, a laptop, a mobile device (e.g., a smart phone, a tablet, a personal digital assistant (PDA), a smart display, a navigation device, etc.), or any other machine with a processor, memory, and communications capabilities. The client device 105 may also include an operating system and at least one application 110, such as a web browser or a dedicated program (e.g., an "app" for a mobile device), that is configured to enable a user of the client device 105 to provide textual input in a selected input language. The textual input in the selected input language may then be transmitted to the one or more servers 120 for processing.

The server 120 may be implemented using systems or devices having a processor, a memory, and communications capability that are configured, as described above, to provide a user with online resources. The online resources may include, for example, web pages, web applications, cloud services (cloud word processing or file management), communication services (e.g., voice-over-internet-protocol communications, instant messaging, email, etc.), online games, or any other resource that may accept textual input of a particular input language. Some aspects of the subject technology are described below with respect to certain online resources and web pages in particular. However, other online resources and resources in general may also be implemented in accordance with various aspects of the subject technology.

A system for automatically selecting an input language for a web page (or other resource) may be implemented on, for example, the client device 105 as part of an operating system or other software such as a web browser or a web browser plugin. The system may be configured to select an input language for an online resource based on a resource identifier for an online resource, based on content analysis of the online resource, or based on a combination of these methods.

Figure 2:
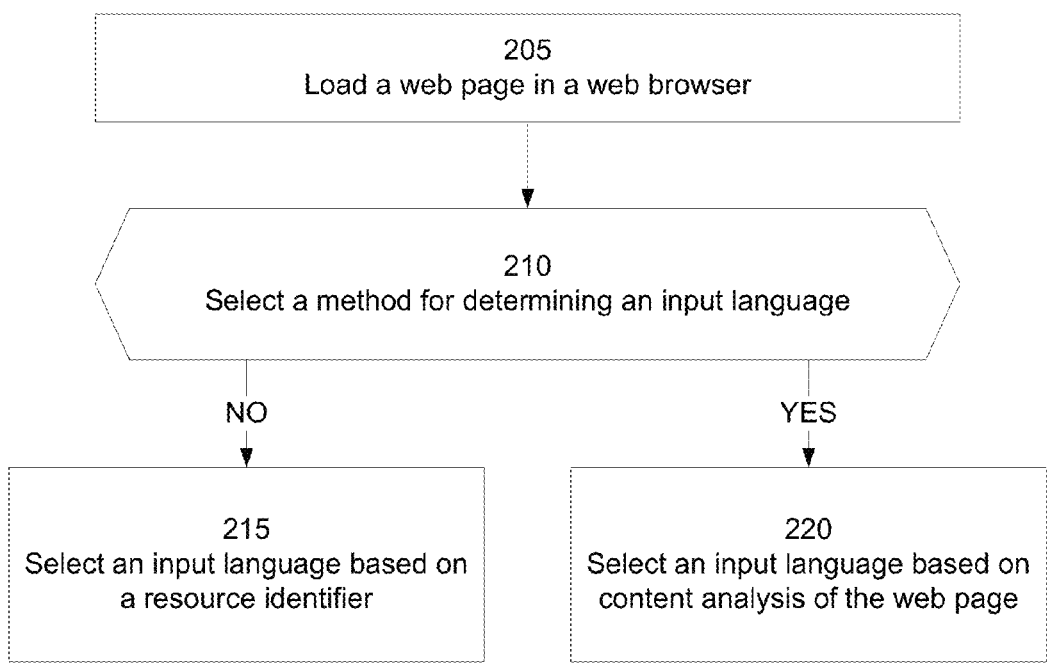
FIG. 2 is a flow chart illustrating an example process for selecting an input language, in accordance with various aspects of the subject technology.

FIG. 2 is a flow chart illustrating an example process 200 for selecting an input language, in accordance with various aspects of the subject technology. Although the blocks in process 200 are shown in one particular order, certain blocks may be executed in different orders or at the same time. The blocks in FIG. 2 are described as being performed by a web browser. However, in other aspects of the subject technology, the blocks may be performed by a web browser plugin, an operating system, or another party. Furthermore, the blocks in FIG. 2 are described with respect to online resources and web pages in particular. Other types of resources, however, may also be used.

At block 205, a web browser may load an online resource (e.g., a web page). For example, the web browser may be instructed to load a web page by a user inputting a universal resource locator (URL) or selecting a link. The web browser may also receive instructions to load the web page from another process or system running on the client device 105 or elsewhere. In response to receiving the instructions to load the web page, the web browser may request the web page from one or more web servers, receive the requested web page from the one or more web servers, and load the web page.

According to some aspects of the subject technology, some methods of determining an input language, such as a content analysis method, may require or may be better adapted when there is at least a certain amount of text. Other methods (e.g., a method based on a resource identifier) may be less dependent on the amount of text in a resource such as a web page. Accordingly, at block 210, the web browser may select a method for determining an input language. For example, the web browser may determine whether to apply a method that selects an input language based on a resource identifier or to apply a method that selects an input language based on content analysis of the web page.

According to some aspects of the subject technology, the selection of the method for determining the input language may be based on whether the textual information in the online resource exceeds at least one text threshold. There may be various text thresholds of different types. For example, some text thresholds may be a minimum number of words or characters in the content of the online resource written in a particular language. For example, a text threshold for the English language may be 300 characters, a text threshold for the Russian language may also be 300 characters, and the text threshold for the Chinese language may be 100 characters. The text thresholds for different languages may vary based on characteristics of the language. For example, in English, several characters may make up a word while in Chinese, each character may be a word. In other cases, some languages are more succinct or concise than others. Other text thresholds may be a number of words in the content of the online resource written in a language. Additionally, a text threshold may also be measured using pixels. For example, the text threshold may be a number of pixels belonging to textual information in the content of the online resource or a ratio of the number of pixels belonging to textual information to the number of pixels belonging to non-textual information.

Figure 3:
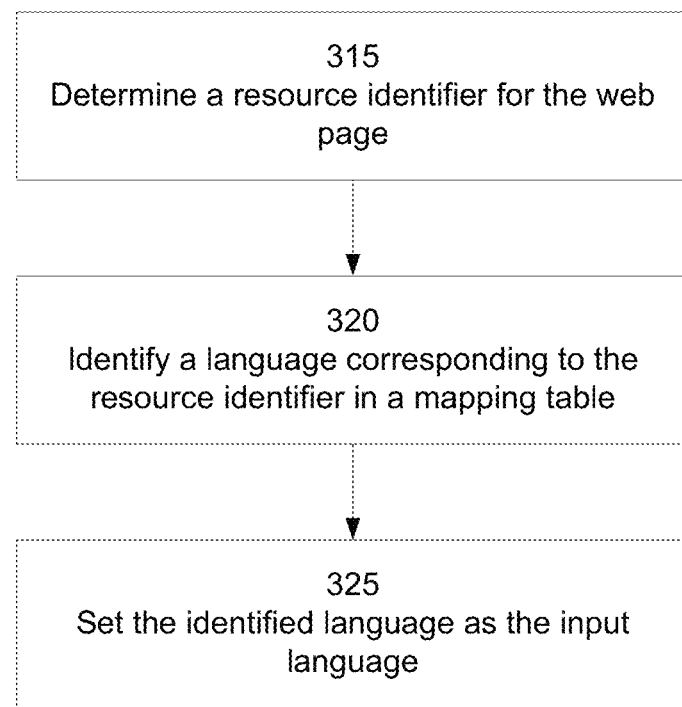
FIG. 3 is a flow chart illustrating an example process for selecting an input language based on a resource identifier, in accordance with various aspects of the subject technology.

If no text threshold is exceeded, at block 215, the web browser may perform a process for selecting an input language based on a resource identifier. FIG. 3 is a flow chart illustrating an example process 300 for selecting an input language based on a resource identifier, in accordance with various aspects of the subject technology. Although the blocks in process 300 are shown in one particular order, certain blocks may be executed in different orders or at the same time. The blocks in FIG. 3 are described as being performed by a web browser. However, in other aspects of the subject technology, the blocks may be performed by a web browser plugin, an operating system, or another party. Furthermore, the blocks in FIG. 3 are described with respect to online resources and web pages in particular. Other types of resources, however, may also be used.

At block 315, the web browser may determine a resource identifier for the online resource. The resource identifier may be, for example, an internet protocol (IP) address, a URL, or a domain name. According to other aspects of the subject technology where the resource is not a web page, resource identifier may be an application identifier (e.g., for an application).

At block 320, the web browser may identify a language corresponding to the resource identifier by looking up the resource identifier in a mapping table that maps the resource identifiers to languages. The mapping table may include a language that is to be used for each resource identifier. For example, the mapping table may be stored in a database or other memory and contain information that associates resource identifiers to locations (e.g., countries, provinces, territories, cities, neighborhoods, etc.) and the primary language used in those locations.

According to various aspects of the subject technology, the mapping table may be stored locally at the client device 105 or on a remote server 120. For a remote server, the web browser may look up the resource identifier by submitting, to the remote server, a request for a language based on the resource identifier and receiving a primary language in response to the request. Once a language has been identified for the resource identifier, at block 325, the web browser may set the identified language as the input language and allow the user to begin inputting characters in the input language.

Figure 4:
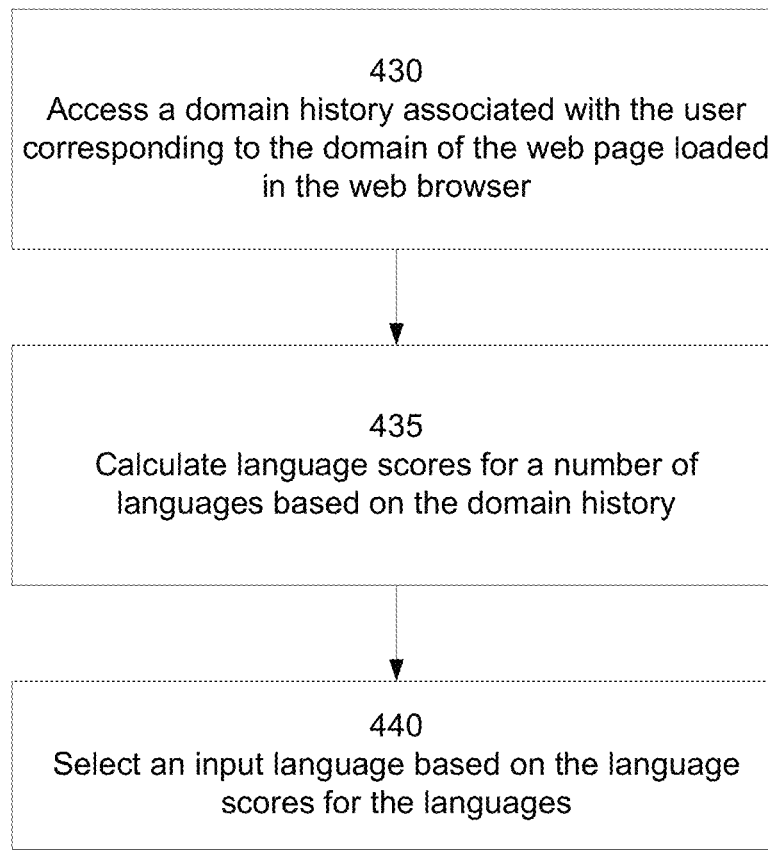
FIG. 4 is a flow chart illustrating an example process for selecting an input language based on content analysis, in accordance with various aspects of the subject technology.

Returning to FIG. 2, if the text threshold for at least one language is exceeded, the web browser may perform a method for selecting an input language based on content analysis of the online resource at block 220. FIG. 4 is a flow chart illustrating an example process 400 for selecting an input language based on content analysis, in accordance with various aspects of the subject technology. Although the blocks in process 400 are shown in one particular order, certain blocks may be executed in different orders or at the same time. The blocks in FIG. 4 are described as being performed by a web browser. However, in other aspects of the subject technology, the blocks may be performed by a web browser plugin, an operating system, or another party. Furthermore, the blocks in FIG. 4 are described with respect to online resources and web pages in particular. Other types of resources, however, may also be used.

At block 430, the web browser may access a domain history associated with the user that corresponds to the domain of the web page loaded in the web browser. The domain history may contain character information for a number of web pages that were visited by the user and are from the same domain as the web page loaded in the web browser. As will be described in more detail further below, the web browser may use the character information in the domain history to calculate language scores for the domain for a number of languages at block 435 and select an input language based on the language scores at block 440.

According to various aspects of the subject technology, a domain history may be stored in a local memory on or in communication with the client device 105 or a remote memory (e.g., on a server). FIG. 5 is a block diagram illustrating a conceptual representation of a domain history 500, in accordance with various aspects of the subject technology. Various domain histories may be stored in memory and each domain history may be associated with a user of a web browser and a domain. For example, the domain history 500 illustrated in FIG. 5 is associated with the user with the user ID "JoeSmith" and with the domain "thisdomain.com."

Each domain history may also contain an entry 520, 525, and 530 for a number of active pages having the associated domain (e.g., thisdomain.com) that a user has visited. According to various aspects of the subject technology, each entry may store an identifier (e.g., a URL) for the active page, a feature vector for the active page, and other information about user visits to the active pages. The other information may include, for example, the last time the user visited or accessed the active page, how often the user visits the active page, how long the user spends on the active page, etc.

According to some aspects of the subject technology, not all web pages belonging to the domain that the user has visited may be added to a domain history as an active page. For example, web pages that are added to a domain history as active pages may include web pages that a user has spent more time on than a minimum time threshold and less time on than a maximum time threshold. Restricting the active pages stored in a domain history to pages that were loaded in the web browser for more than the minimum time threshold increases the likelihood that the user actually viewed or read the webpage, while restricting the active pages to pages that were loaded in the web browser for less than the maximum time threshold increases the likelihood that the user was actually viewing the web page and did not leave the computer or the web browser idling with the web page loaded.

Furthermore, the number of active pages stored in the domain history may be limited to a certain number to reduce computing resources needed to store the domain histories for a user and the computing resources needed to determine an input language. The active pages stored in the domain history may be stored in a first in, first out manner. For example, when a new active page meeting the threshold requirements is to be stored in the domain history, the oldest active page may be removed.

A feature vector for an active page is a data structure that specifies a language and the number of language units that are found in the active page. The language unit of a language is defined by the granularity that a sentence is composed in such language. For example, English sentences are composed of words, so a word corresponds to one English language unit. Chinese sentences are composed of characters, so a character corresponds to one Chinese language unit. According to the scenario illustrated in FIG. 5, the feature vector is defined as <English, Chinese, Japanese, French> and the content of the active page corresponding to entry 520 has 10 English language units, 100 Chinese language units, 50 Japanese language units, and no French language units, the feature vector for the active page is <10, 100, 50, 0>.

With respect to block 435 of FIG. 4 described above, according to various aspects of the subject technology, the web browser may use the feature vectors in the domain history to calculate language scores for a number of languages. For example, in the scenario illustrated in FIG. 5, the web browser may calculate language scores for English, Chinese, Japanese, and French.

According to one implementation, the language score for a language (e.g., language "i") may be denoted as s(j) be calculated using the equation:

$$s(j)=w(1,j)f(1,j)+ \ldots +w(i,j)f(i,j)+ \ldots +w(h,j)f(h,j) \quad \text{(Equation 1)}$$

where f(i, j) is the value of language j at feature vector for active page i, w(i, j) is a weight given for each vector i and language j, and h is the total number of active pages stored in the domain history. For example, referring to the example feature vector given above, if the feature vector for the first active page (e.g., i=1) is <10, 100, 50, 0> and j is the third language in the feature vector, then f(1, 3) would be 50.

The weights for each vector i and language j may vary based on the implementation. In some variations, the weight may be constant for all active pages and all languages. In other variations, w(i, j) may be a function of i and j and used to give more weight to newer active pages and/or to pages the user has spent more time on. According to additional aspects, different languages may be weighted differently as well.

With respect to block 440 in FIG. 4 described above, the web browser may select an input language for the web page loaded in the web browser based on the language scores calculated for each of the languages. For example, the language with the highest language score may be selected as the input language. Once the input language is selected, when the user inputs text into the web page on the web browser, the text is inputted according to the selected input language.

For example, if the web browser loads a web page having the same domain as the domain associated with the domain history 500 in FIG. 5, the web browser may retrieve domain history 500 and calculate language scores for languages tracked in the domain history 500 based on the active pages in domain history 500. For illustrative purposes, domain history 500 may track English, Chinese, Japanese, and French and contain 5 active pages (not all entries for the active pages are shown in FIG. 5). Each active page is associated with a feature vector that includes the number of language units that each active page contains.

The feature vectors may be defined by: <English, Chinese, Japanese, French> where each value is the number of language units of the respective language. The feature vectors of the 5 active pages may be as follows:
<10, 100, 50, 0>;
<20, 30, 0, 0>;
<50, 200, 0, 10>;
<30, 30, 0, 10>; and
<60, 50, 20, 0>.

If we assume that all active pages and languages are weighted the same (e.g., w(i, j)=1 for all i and all j), then, according to one scenario, the language scores for each language would be:
s(English)=10+20+50+30+60=170;
s(Chinese)=100+30+200+30+50=410;
s(Japanese)=50+20=70; and
s(French)=10+10=20.

Because the language score for Chinese (e.g., s(Chinese)) is the highest language score, the web browser may select Chinese as the input language.

Various aspects described above relate to a process for selecting an input language by first determining whether to select an input language based on a resource identifier as illustrated in FIG. 3, or to select an input language based on content analysis as illustrated in FIG. 4. However, according to other aspects of the subject technology, the processes described in FIG. 3 and FIG. 4 may be used separately. Each of the processes described in FIG. 3 and FIG. 4 may be used independently to select an input language, without first determining which process to execute.

Accordingly, the web browser is configured to automatically select an input language for a web page without the user having to manually select a language. Furthermore, when the user visits multiple web pages, the web browser may be configured to switch between input languages depending on the web page (or other resource) loaded in the web browser. Instead of selecting or switching an input language, the user may simply begin typing. However, according to various aspects of the subject technology, the user may still have the option of selecting a desired input language.

Figure 6:
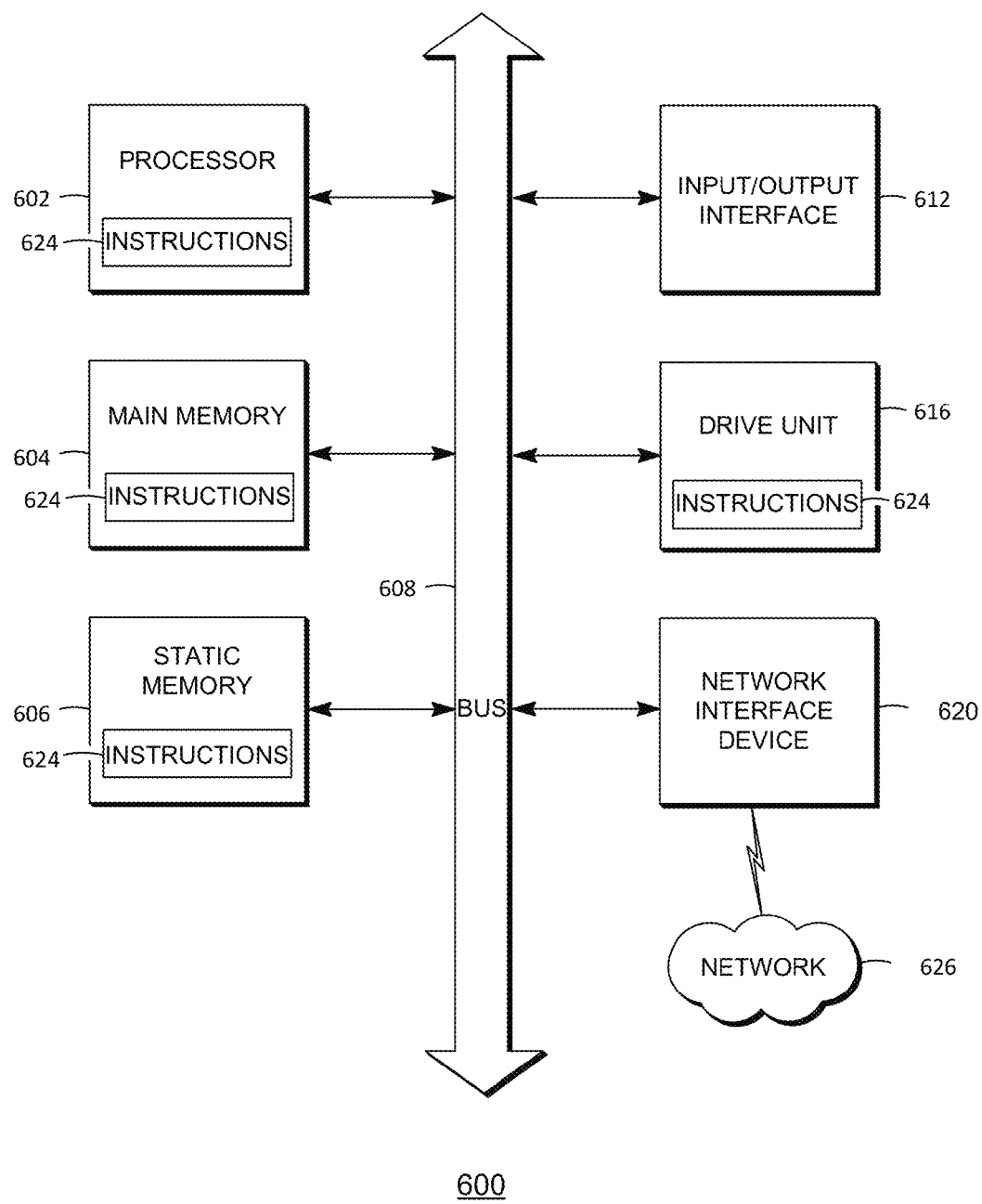
FIG. 6 is a block diagram illustrating a computer system with which any of the machines or servers described herein may be implemented, in accordance with various aspects of the subject technology.

FIG. 6 is a block diagram illustrating a computer system with which any of the machines or servers described herein may be implemented, in accordance with various aspects of the subject technology. In certain aspects, the computer system 600 may be implemented using hardware or a combination of software and hardware, either in a dedicated server, or integrated into another entity, or distributed across multiple entities.

The example computer system 600 includes a processor 602, a main memory 604, a static memory 606, a disk drive unit 616, and a network interface device 620 which communicate with each other via a bus 608. The computer system 600 may further include an input/output interface 612 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 602 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 624 embodying any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media. The instructions 624 may further be transmitted or received over a network 626 via the network interface device 620.

The machine-readable medium may be a single medium or multiple media (e.g., a centralized or distributed database, and/or associated caches and servers) that store the one or more sets of instructions. The machine-readable medium may include the drive unit 616, the static memory 606, the main memory 604, the processor 602, an external memory connected to the input/output interface 612, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for providing an encryption key to a user are provided. The system may include a key storage module, an interface module, and an authentication module. The key storage module may be configured to store an encryption key for a user on an encryption key server, wherein the encryption key is associated with storing user data on a data storage server. The interface module may be configured to receive a request for the encryption key from a client machine associated with the user. The authentication module may be configured to authenticate the user, wherein the interface module may further be configured to transmit the encryption key to the client machine in response to authenticating the user.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for selecting an input language for a web page, the method comprising:
    accessing a domain history' corresponding to a domain of the web page loaded in a web browser, wherein the domain history contains a feature vector for each of one or more active pages visited by a user and belonging to the domain, the one or more active pages are web pages that were loaded for viewing in the web browser by the user for longer than a minimum time threshold and less than a maximum time threshold, the feature vector comprises a data structure that specifies a plurality of languages and numbers of language units found in the respective active page, the plurality of languages and the numbers of language units being based on content of the respective active page, and each number of the numbers of language units corresponds to a number of characters or words of a respective language in the respective active page;
    calculating a language score for each language in the plurality of languages based on the numbers of language units; and
    automatically selecting, using a processor, an input language for the web page from the plurality of languages based on the calculated language scores.

2. A system for selecting an input language, the system comprising:
    one or more processors; and
    a machine-readable medium comprising instructions stored therein, which when executed by the one or more processors, cause the one or more processors to perform operations comprising:
    accessing a domain history corresponding to a domain of an online resource loaded in a web browser, wherein the domain history contains a feature vector for each of one or more active resources visited by a user and belonging to the domain, the one or more active resources are online resources that were loaded for viewing in the web browser by the user for longer than a minimum time threshold and less than a maximum time threshold, the feature vector comprises a data structure that specifies a plurality of languages and numbers of language units found in the respective active resource, the plurality of languages and the numbers of language units being based on content of the respective active resource, and each number of the numbers of language units corresponds to a number of characters or words of a respective language in the respective active resource;
    calculating a language score for each language in the plurality of languages based on the numbers of language units; and automatically selecting an input language for the online resource from the plurality of languages based on the calculated language scores.

3. A non-transitory machine-readable medium comprising instructions stored therein, which when executed by a machine, cause the machine to perform operations comprising:

loading a resource in a user interface;
determining whether contents of the resource have textual information that satisfies at least one text threshold;
when the contents satisfy the at least one text threshold:
accessing a domain history corresponding to a domain of the resources loaded in the user interface, wherein the domain history contains a feature vector for each of one or more active resources visited by a user and belonging to the domain, the one or more active resources are resources that were loaded for viewing in a user interface by the user for longer than a minimum time threshold and less than a maximum time threshold, the feature vector comprises a data structure that specifies a plurality of languages and numbers of language units found in the respective active resource, the plurality of languages and the numbers of language units being based on content of the respective active resource, and each number of the numbers of language units corresponds to a number of characters or words of a respective language in the respective active resource;
automatically setting an input language for the resource based on the domain history;
when the contents do not satisfy the at least one text threshold:
identifying a resource identifier for the resource;
identifying a language corresponding to the resource identifier in a mapping table that maps a plurality of resource identifiers to a plurality of languages; and
automatically sating the identified language as the input language for the resource.

4. The computer-implemented method of claim 1, further comprising:
loading the web page in the web browser; and
determining whether contents of the web page have textual information that exceeds at least one text threshold, wherein the accessing, the calculating, and the selecting are performed when the contents of the web page have textual information that exceeds at least one text threshold.

5. The computer-implemented method of claim 1, wherein the domain history is stored on a remote server.

6. The computer-implemented method of claim 1, wherein the domain history is for the user.

7. The computer-implemented method of claim 1, wherein the language score for each language is calculated using an equation where each feature vector and each language are assigned a weight.

8. The computer-implemented method of claim 1, wherein at least one number of the numbers of language units, as specified in the data structure, corresponds to a respective number of characters of a first language in the respective active page, and at least one second number of the numbers of language units corresponds to a respective number of words of a second language in the respective active page.

9. The computer-implemented method of claim 1, wherein each language of the plurality of languages, as specified in the data structure, is different from each other language of the plurality of languages, and each number of the numbers of language units corresponds to a respective language of the plurality of languages.

10. The computer-implemented method of claim 1, wherein calculating the language score for each language in the plurality of languages further comprises:
determining a first language score for a first language of the plurality of languages found in the respective active page; and
determining a second language score for a second language of the plurality of languages found in the respective active page.

11. The system of claim 2, wherein the operations further comprise:
loading the online resource in the web browser; and
determining whether contents of the online resource have textual information that exceeds at least one text threshold, wherein the accessing, the calculating, and the selecting are performed when the contents of the online resource have textual information that exceeds at least one text threshold.

12. The non-transitory machine-readable medium of claim 3, wherein, when the contents of the resource satisfy the at least one text threshold, the operations further comprise:
calculating a language score for each language in the plurality of languages based on the numbers of language units,
wherein automatically setting the input language for the resource based on the domain history comprises automatically selecting the input language for the resource based on the calculated language scores.

13. The non-transitory machine-readable medium of claim 3, wherein the mapping table is stored on a remote server, and wherein, when the contents of the resource do not satisfy the at least one text threshold, the operations further comprise:
submitting, to the remote server, a request for a language based on the resource identifier; and
receiving, from the remote server, the language in response to the request.

14. The non-transitory machine-readable medium of claim 3, wherein the resource is a web page.

15. The computer-implemented method of claim 4, further comprising, when the contents of the web page do not exceed at least one text threshold:
identifying a resource identifier for the web page;
identifying a language corresponding to the resource identifier in a mapping table that maps a plurality of resource identifiers to the plurality of languages; and
setting the identified language as the input language.

16. The computer-implemented method of claim 4, wherein the at least one text threshold comprises a number of language units in a particular language.

17. The computer-implemented method of claim 7, wherein each feature vector and each language is assigned a weight based on a newness of the active pages or time spent on the active pages.

18. The system of claim 11, wherein, when the contents of the online resource do not exceed at least one text threshold, the operations further comprise:
identifying a resource identifier for the online resource;
identifying a language corresponding to the resource identifier in a mapping table that maps a plurality of resource identifiers to the plurality of languages; and
setting the identified language as the input language.

19. The system of claim 11, wherein the at least one text threshold comprises a number of characters in a particular language.

20. The computer-implemented method of claim 15, wherein the mapping table is stored on a remote server, and wherein the method further comprises:
- submitting, to the remote server, a request for a language based on the resource identifier; and
- receiving, from the remote server, the language in response to the request.

\* \* \* \* \*

UNITED STATES PATENT AND TRADEMARK OFFICE
CERTIFICATE OF CORRECTION

PATENT NO. : 9,760,624 B1  
APPLICATION NO. : 14/058134  
DATED : September 12, 2017  
INVENTOR(S) : Bor-Yiing Su Page 1 of 1

It is certified that error appears in the above-identified patent and that said Letters Patent is hereby corrected as shown below:

In the Claims

Claim 1, Column 10, Line 19, "domain history' corresponding" should read --domain history corresponding--.

Claim 3, Column 11, Line 37, "automatically sating" should read --automatically setting--.

Signed and Sealed this  
Twenty-fourth Day of September, 2019

Andrei Iancu  
*Director of the United States Patent and Trademark Office*